United States Patent
Takahata (10) Patent No.: US 8,980,482 B2
(45) Date of Patent: Mar. 17, 2015

(54) NONAQUEOUS ELECTROLYTE LITHIUM ION SECONDARY BATTERY

(75) Inventor: Koji Takahata, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 4 days.

(21) Appl. No.: 13/390,583

(22) PCT Filed: Aug. 24, 2009

(86) PCT No.: PCT/JP2009/064718
§ 371 (c)(1),
(2), (4) Date: Feb. 15, 2012

(87) PCT Pub. No.: WO2011/024251
PCT Pub. Date: Mar. 3, 2011

(65) Prior Publication Data
US 2012/0141884 A1    Jun. 7, 2012

(51) Int. Cl.
*H01M 6/16*  (2006.01)
*H01M 10/0569*  (2010.01)
*H01M 10/0525*  (2010.01)
*H01M 10/0567*  (2010.01)

(52) U.S. Cl.
CPC ...... *H01M 10/0569* (2013.01); *H01M 10/0525* (2013.01); *H01M 10/0567* (2013.01); *H01M 2300/0025* (2013.01); *Y02T 10/7011* (2013.01); *Y02E 60/122* (2013.01)
USPC .......................................... 429/332; 429/330

(58) Field of Classification Search
USPC ................................. 429/188, 207, 300–347
See application file for complete search history.

(56) References Cited

U.S. PATENT DOCUMENTS

| | | | |
|---|---|---|---|
| 7,524,588 | B2 | 4/2009 | Takahashi |
| 2003/0054259 | A1 | 3/2003 | Murai et al. |
| 2006/0147807 | A1 | 7/2006 | Kim et al. |
| 2006/0222944 | A1* | 10/2006 | Yamamoto et al. ........ 429/218.1 |
| 2007/0254215 | A1* | 11/2007 | Morikawa et al. ............ 429/324 |
| 2008/0020276 | A1 | 1/2008 | Horikawa |

FOREIGN PATENT DOCUMENTS

| | | |
|---|---|---|
| CN | 1797836 | 7/2006 |
| CN | 101010828 | 8/2007 |
| JP | 2001-6729 | 1/2001 |
| JP | 2001-57236 | 2/2001 |

(Continued)

OTHER PUBLICATIONS

International Search Report in International Application No. PCT/JP2009/064718; Mailing Date: Oct. 6, 2009.

*Primary Examiner* — Muhammad Siddiquee (74) *Attorney, Agent, or Firm* — Finnegan, Henderson, Farabow, Garrett & Dunner, LLP (57) ABSTRACT

The present invention provides a lithium-ion secondary battery with excellent high-temperature storage characteristics. The lithium-ion secondary battery provided by the present invention has positive and negative electrodes capable of absorbing and desorbing lithium ions, and an electrolyte solution containing a lithium salt as a supporting salt in an organic solvent. The nonaqueous electrolyte contains not only the lithium salt, but also at least one type of dicarboxylic acid as additive A; and at least one type of additive selected from vinylene carbonate, vinylethylene carbonate, ethylene sulfite, and fluoroethylene carbonate as additive B.

7 Claims, 5 Drawing Sheets

(56) References Cited

FOREIGN PATENT DOCUMENTS

| | | |
|---|---|---|
| JP | 2001-229964 | 8/2001 |
| JP | 2002-8717 | 1/2002 |
| JP | 2002-352852 | 12/2002 |
| JP | 2003-151623 | 5/2003 |
| JP | 2004-6188 | 1/2004 |
| JP | 2004-335379 | 11/2004 |
| JP | 2007-172947 | 7/2007 |
| JP | 2007-227235 | 9/2007 |
| JP | 2007-287518 | 11/2007 |
| JP | 2008-53212 | 3/2008 |

* cited by examiner

FIG.7

NONAQUEOUS ELECTROLYTE LITHIUM ION SECONDARY BATTERY

CROSS-REFERENCE TO RELATED APPLICATIONS

This application is a national phase application of International Application No. PCT/JP2009/064718, filed Aug. 24, 2009, the content of which are incorporated herein by reference.

TECHNICAL FIELD

The present invention relates to a lithium-ion secondary battery with excellent high-temperature storage characteristics.

BACKGROUND ART

Lithium-ion secondary batteries have positive and negative electrodes that can reversibly absorb and desorb lithium ions, and an electrolyte interposed between the both electrodes, and perform perform charge and discharge by moving back and forth of lithium ions between the both electrodes. Lithium-ion secondary batteries are used as a power source in various kinds of portable devices because they are lightweight and have a high energy density. Moreover, the use of lithium-ion secondary batteries has been studied in fields that require large capacity power sources such as hybrid automobiles, electric automobiles, and the like where even greater improvement in battery performance is needed. More specifically, excellent high-temperature storage characteristics are important in lithium-ion secondary batteries intended for application in automobiles and other environments in which usage and storage temperatures can become high.

Patent Document 1: Japanese Patent Application Laid-open No. 2001-6729
Patent Document 2: Japanese Patent Application Laid-open No. 2002-352852

DISCLOSURE OF THE INVENTION

Technical Problem

When a lithium-ion secondary batteries are charged and discharged, however, the electrolyte component (nonaqueous solvent, supporting salt, etc.) can cause a reductive decomposition reaction on the surface of the negative electrode, and the battery deteriorates as a result. Means of preventing this battery deterioration include a method wherein some of the electrolyte component is reductively decomposed intentionally during initial charging to coat the surface of the negative electrode with an SEI (Solid Electrolyte Interphase) film comprising these decomposition products. This can prevent further reductive decomposition of the electrolyte components at the surface of the negative electrode during normal battery use. There has been a problem with batteries of this form, however, because when they are left under high temperature conditions, additional decomposition product builds up on the SEI film, which causes the internal resistance to increase and, as a result, the battery deteriorates. Patent Document 1 indicates that battery deterioration resulting from high-temperature storage can be controlled by using an electrolyte solution that contains vinylethylene carbonate. Moreover, Patent Document 2 indicates that high-temperature storage characteristics can be improved by using an electrolyte solution that contains, for example, vinylene carbonate and/or vinylethylene carbonate.

However, research by the inventors has revealed that the effect of improved high-temperature storage characteristics even with the use of these additives to the electrolyte solution is inadequate or can be unstable in some cases.

An object of the present invention is to provide a lithium-ion secondary battery wherein excellent high-temperature storage characteristics can be stably realized.

Solution to Problem

The inventors discovered that excellent high-temperature storage characteristics can be stably realized by using given additives, thus completing the present invention.

The present invention provides a lithium-ion secondary battery having positive and negative electrodes capable of absorbing and desorbing lithium ions, and a nonaqueous electrolyte containing a lithium salt as a supporting salt in an organic solvent. The nonaqueous electrolyte contains not only the lithium salt, but also at least one type of dicarboxylic acid as additive A; and at least one type of additive selected from a group consisting of vinylene carbonate (VC), vinylethylene carbonate (VEC), ethylene sulfite, and fluoroethylene carbonate as additive B.

In a battery using an electrolyte solution with a composition containing additives A and B, an effect of improved high-temperature storage characteristics can be stably obtained regardless of the water content inside the battery. This is because unlike an acid anhydride, a dicarboxylic acid does not react with water and decompose. Therefore, an electrolyte solution with this kind of composition enables the concentration ratio between additives A and B to be remain fixed even if water should enter the battery during the assembly process, etc., so excellent high-temperature storage characteristics can be stably realized.

In one preferred mode of the lithium-ion secondary battery disclosed herein, the total amount of additive A contained in the nonaqueous electrolyte is 0.2% by mass to 3% by mass. This value increases the stability of the SEI film even more, and enables a lithium-ion secondary battery with even better high-temperature storage characteristics to be formed.

In another preferred mode, the total amount of additive B contained in the nonaqueous electrolyte is 0.1% by mass to 0.3% by mass. This value increases the stability of the SEI film even more, and enables a lithium-ion secondary battery with even better high-temperature storage characteristics to be formed.

As noted above, the technology disclosed herein enables the realization of a lithium-ion secondary battery with excellent high temperature storage characteristics. Such a battery is most suitable as a battery to be mounted in a product that can be left under high-temperature conditions, such as a vehicle, for example, that can be left in direct sunlight in summer. Therefore, the present invention provides a vehicle equipped with any of the lithium-ion secondary batteries disclosed herein. More specifically, preferably this vehicle (for example, an automobile) is equipped with such a lithium-ion secondary battery as a power source (typically, a power source for a hybrid vehicle or electric vehicle).

DESCRIPTION OF EMBODIMENTS

Preferred embodiments of the present invention are described below. It should also be noted that matters necessary for carrying out the present invention other than those specifically referred to in this description are understood to be matters of design for a person skilled in the art based on the prior art in this field. The present invention can be carried out on the basis of the content disclosed herein and common technical knowledge in this field.

The lithium-ion secondary battery disclosed herein provides an electrode assembly with positive and negative electrodes capable of absorbing and desorbing lithium ions, and an electrolyte solution containing, in addition to a lithium salt as a supporting salt, additive A and additive B in an organic solvent (nonaqueous medium).

Any lithium salt that is generally used as a supporting salt in a lithium-ion secondary battery can be suitably selected and used as the supporting salt contained in the nonaqueous electrolyte. Examples of such a lithium salt include $LiPF_6$, $LiBF_4$, $LiClO_4$, $LiAsF_6$, $Li(CF_3SO_2)_2N$, and $LiCF_3SO_3$. Only one type of these lithium salts can be used alone, or two or more types can be combined and used together. $LiPF_6$ can be noted as a particularly preferred example. Preferably the nonaqueous electrolyte is prepared so that the concentration of the supporting salt lies within the range of 0.7 m/L to 1.3 mol/L.

Any organic solvent that is generally used in a lithium-ion secondary battery can be suitably selected and used as the nonaqueous medium. An example of a particularly preferred nonaqueous medium is a carbonate such as ethylene carbonate (EC), dimethyl carbonate (DMC), ethyl methyl carbonate (EMC), diethyl carbonate (DEC) and propylene carbonate (PC). Only one type of these organic solvents can be used alone, or two or more types can be combined and used together. For example, a mixture of EC, DMC, and EMC can be used in an approximate volumetric ratio of 2 to 5:2 to 5:2 to 5.

Only one type of dicarboxylic acid can be used alone, or two or more types can be combined and used together as additive A.

Preferred examples of dicarboxylic to be used include oxalic acid, malonic acid, maleic acid, succinic acid, citraconic acids acid, glutaric acid, diglycolic acid, cyclohexane dicarboxylic acid, phenyl succinic acid, and 2-phenyl glutaric acid. Oxalic acid can be noted as a particularly preferred dicarboxylic acid.

Preferably the total amount of additive A contained in the nonaqueous electrolyte lies in the range of about 0.2% by mass to 3% by mass. If the amount of additive A is much below this range, a stable SEI film will not be formed, and the internal resistance may increase conspicuously along with high-temperature storage. If the amount is much higher than this range, the amount of decomposition product from additive A in the SEI film will increase, film resistance will increase, and the internal resistance may increase conspicuously along with high-temperature storage.

One type of substance selected from vinylene carbonate (VC), vinyl ethylene carbonates (VEC), ethylene sulfite, and fluoroethylene carbonate can be used alone, or two or more types can be combined and used together as additive B.

Preferably the amount of additive B contained in the nonaqueous electrolyte lies in the range of about 0.1% by mass to 3% by mass. If the amount of additive B is much below this range, a stable SEI film will not be formed, and high-temperature storage may bring about a conspicuous increase in the internal resistance and a drop in capacity retention. If the amount of additive B is much higher than this range, the internal resistance may increase conspicuously along with high-temperature storage.

Preferably the mass ratio of additive A to additive B (A:B) contained in the nonaqueous electrolyte lies in the range of about 1:5 to 10:1. This enables the rate of increase in internal resistance accompanying high-temperature storage to be held to a low level. Moreover, this also enables a high level of capacity retention (for example, about 90%) to be obtained after high-temperature storage. For example, the above mass ratio (ratio of added amounts) can be used when additive A is oxalic acid and additive B is VC.

It should also be noted that in addition to the above components, the nonaqueous electrolyte can contain other prior art, publicly known components (i.e., other additives) used in lithium-ion secondary batteries within a range such that the advantageous effect of the present invention is not lost.

The lithium-ion secondary battery as in the present invention is described in detail below while referencing the drawings, which use as an example a lithium-ion secondary battery 100 (FIG. 1) in a mode wherein the electrode assembly and nonaqueous electrolyte are housed in a square battery case. However, this is by no means intended to limit the present invention to these embodiments. More specifically, the shape of the lithium-ion secondary battery of the present invention is not particularly limited, and the material, shape, size, etc., of components such as the battery case and electrode assembly can be suitably selected according to the intended use and capacity. For example, the battery case can have a rectangular, flat, cylindrical, or other shape. It should also be noted that in the following drawings, all members and sites providing the same effect are indicated by the same reference numbers, and redundant descriptions have been omitted or abbreviated. Moreover, the dimensional relationships (of length, width, height, etc.) in the drawings do not depict actual dimensional relationships.

Figure 1:
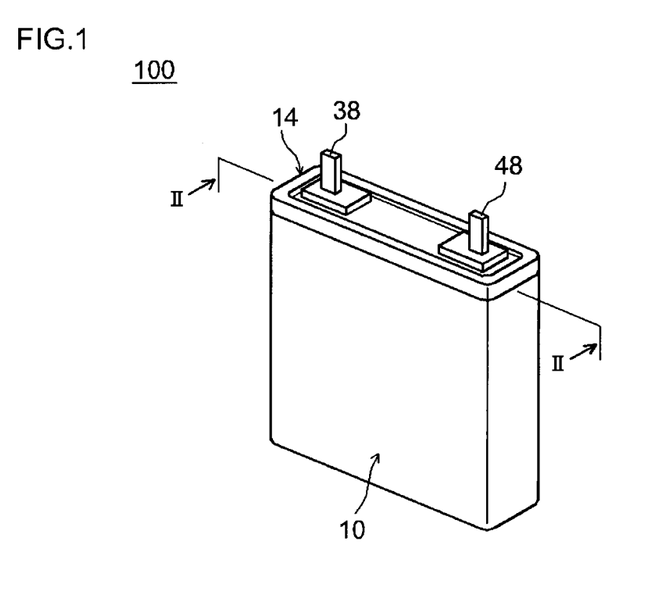
FIG. 1 is a perspective view schematically illustrating the exterior of the lithium-ion secondary battery in one embodiment.
Figure 2:
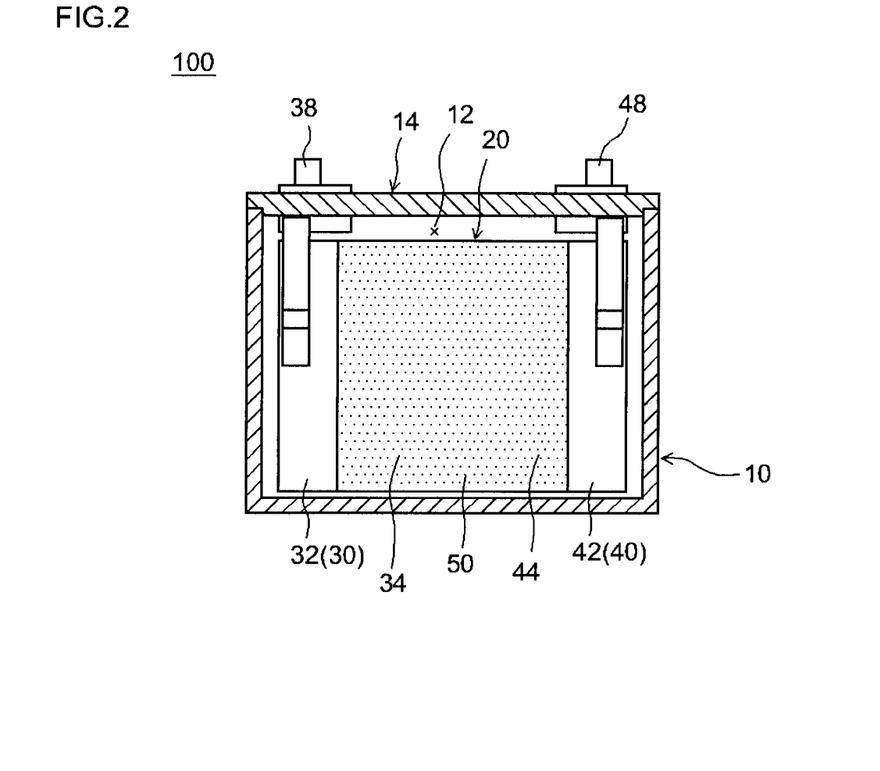
FIG. 2 is a cross-sectional view taken along the line II-II of FIG. 1.

As illustrated in FIG. 1 and FIG. 2, the battery 100 in these embodiments can be constructed by placing a wound electrode assembly 20 together with an electrolyte solution (not illustrated) via an opening 12 into a flattened box-shaped battery case 10 that matches the shape of the electrode assembly 20, then and sealing the opening 12 in the case 10 with a lid 14. Furthermore, a positive terminal 38 and a negative terminal 48 for connection to the outside are provided in the lid 14 so that a part of each protrudes from the inside through the surface of the lid 14.

The above electrode assembly 20 is formed into a flattened shape by overlaying and winding a positive electrode sheet 30, which is formed by a positive electrode active material layer 34 on the surface of a continuous sheet positive current collector 32, and a negative electrode sheet 40, which is formed by a negative electrode active material layer 44 on the surface of a continuous sheet negative current collector 42, together with two continuous sheet separators 50, and then deforming the resulting wound assembly by lateral compression.

In addition, the positive electrode sheet 30 is formed to expose the positive current collector 32 by not providing (or removing) the positive electrode active material layer 34 at one end thereof along the lengthwise direction. Similarly, the negative electrode sheet 40 is formed to expose the negative current collector 42 by not providing (or removing) the negative electrode active material layer 44 at one end thereof along the lengthwise direction. The positive terminal 38 is connected to the exposed end of the positive current collector 32 and the negative terminal 48 is connected to the exposed end of the negative current collector 42, respectively, to form electrical connections with the positive electrode sheet 30 and the negative electrode sheet 40 of the wound current collector 20 that has been formed into a flattened shape. The positive and negative terminals 38, 48 are connected to their respective positive and negative collectors 32, 42, for example, by ultrasonic welding, resistance welding, and the like.

The positive electrode active material layer 34 can be preferably formed, for example, by dispersing the positive electrode active material in a suitable solvent together with a conductive material, binder, etc., as needed to prepare a paste or slurry composition (positive electrode mixture), and then applying the same to the positive current collector 32 and drying.

A positive electrode material capable of absorbing and desorbing lithium can be used as the positive electrode active material, and one or more types of materials used previously in lithium-ion secondary batteries (for example, an oxide with a layered structure or an oxide with a spinel structure) can be used herein with no particular limitation. Examples include lithium-containing composite oxides such as lithium-nickel composite oxides, lithium-cobalt composite oxides, lithium-manganese composite oxides, and lithium-magnesium composite oxides.

The term lithium-nickel composite oxide used herein encompasses not only oxides having lithium (Li) and nickel (Ni) as constituent metal elements, but also oxides that include at least one type of metal element other than lithium and nickel (i.e., a transition metal element and/or typical metal element other than Li and Ni) as a constituent metal element at a ratio roughly equal to or less than nickel (typically a ratio less than nickel) when calculated by the number of atoms. The metal element other than Li and Ni can be, for example, one or more types of metal elements selected from a group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). It should also noted that this definition likewise applies to lithium-cobalt composite oxides, lithium-manganese composite oxides, and lithium-magnesium composite oxides.

Moreover, an olivine lithium phosphate represented by the general formula $LiMPO_4$ (wherein M is at least one or more types of elements from among Co, Ni, Mn, and Fe; e.g., $LiFePO_4$ and $LiMnPO_4$) can be used as the positive electrode active material.

The amount of positive electrode active material contained in the positive electrode mixture can be, for example, about 80% by mass to 95% by mass.

Preferably a conductive powdered material such as carbon powder, carbon fibers, etc., is used as the conductive material. Various types of carbon black, for example, acetylene black, furnace black, Ketjen black, graphite powder and the like are preferred as the carbon powder. Only one type of conductive material can be used alone, or two or more types can be combined and used together.

The amount of conductive material contained in the positive electrode material can be suitably selected in accordance to the type and amount of positive electrode active material, and can be set, for example, at about 4% by mass to 15% by mass.

A material suitably selected, for example, from water-soluble polymers that dissolve in water, water-dispersible polymers, polymers that dissolve in a nonaqueous medium (organic solvent), and the like can be used as the binder. Only one type of material can be used alone, or two or more types can be combined and used together.

Examples of water-soluble polymers include carboxy methylcellulose (CMC), methylcellulose (MC), cellulose acetate phthalate (CAP), hydroxypropyl methylcellulose (HPMC), hydroxypropyl methylcellulose phthalate (HP-MCP) and polyvinyl alcohols (PVA).

Examples of water-dispersible polymers include polytetrafluoroethylene (PTFE), tetrafluoroethylene-perfluoro-alkyl vinyl ether copolymer (PFA), tetrafluoroethylene-hexafluoropropylene copolymer (FEP), ethylene-tetrafluoro-ethylene copolymer (ETFE), and other fluorinated resins; and vinyl acetate copolymers, styrene butadiene block copolymers (SBR), acrylic acid-modified SBR resins (SBR latex), gum arabic, and other types of rubber.

Examples of polymers that dissolve in a nonaqueous medium (organic solvent) include poly(vinylidene fluoride) (PVDF), poly(vinylidene chloride) (PVDC), polyethylene oxide (PEO), polypropylene oxide (PPO), and polyethylene oxide-polypropylene oxide copolymer (PEO-PPO).

The amount of added binder can be suitably selected in accordance with the type and amount of positive electrode active material, and can be set, for example, at about 1% by mass to 5% by mass of the positive electrode mixture.

Preferably a conductive material containing a metal with good conductivity is used in the positive current collector 32. For example, aluminum or an alloy having aluminum as the primary component can be used. The shape of the positive current collector 32 is not particularly limited herein because it can differ in accordance with the shape, etc., of the lithium-ion secondary battery, and it can assume a variety of shapes such as a rod, plate, sheet, foil, mesh, and so on. In these embodiments a sheet-shaped aluminum positive current collector 32 is used, and preferably it is used in a lithium-ion secondary battery 100 featuring a wound electrode assembly 20. In these embodiments, for example, preferably an aluminum sheet with a thickness of about 10 µm to 30 µm can be used.

Moreover, the negative electrode active material layer 44 can be preferably formed, for example, by dispersing the negative electrode active material in a suitable solvent together with a negative conductive material, binder, etc., (negative electrode mixture) to prepare a paste or slurry composition, and then applying the same to the negative current collector 42 and drying.

As the negative electrode active material, one or more types of materials used previously in lithium-ion secondary batteries can be used without limitation. For example, carbon particles can be noted as a suitable negative electrode active material. Preferably a particulate carbon material at least partly comprising a graphite structure (layered structure) is used. So-called black leads (graphites), non-graphitizable carbons (hard carbons), graphitizable carbons (soft carbons), and any carbon material having a combination of these structures can be suitably used. In particular, natural graphite and other graphite particles can be preferably used therefrom. Graphite particles have excellent conductivity because they can suitably absorb lithium ions as charge carriers. Moreover, they can serve as a negative electrode active material suited for rapid charging and discharging (e.g., high output discharging) because they have a small particle size, and a large surface area per unit volume.

The amount of negative electrode active material contained in the negative electrode mixture is not particularly limited herein, but is preferably about 90% by mass to 99% by mass, and more preferably about 95% by mass to 99% by mass.

As the binder for the negative electrode active material, only one type of substance similar to that of the positive electrode noted above can be used alone, or two or more types thereof can be combined and used together. The amount of added binder can be suitably selected in accordance with the type and amount of negative electrode active material, and can be set, for example, at about 1% by mass to 5% by mass of the negative electrode active material.

Preferably a conductive material containing a metal with good conductivity is used as the negative current collector 42. For example, copper or an alloy having copper as the primary component can be used. The shape of the negative current collector 42 is not particularly limited herein because it can differ in accordance with the shape, etc., of the lithium-ion secondary battery, and it can assume a variety of shapes such as a rod, plate, sheet, foil, mesh, and so on. In these embodiments a sheet-shaped copper negative current collector 42 is used, and preferably it is used in a lithium-ion secondary battery 100 featuring a wound electrode assembly 20. For example, preferably a copper sheet with a thickness of about 6 μm to 30 μm can be used in these embodiments.

Moreover, the above separator 50 is a sheet disposed between the positive electrode sheet 30 and the negative electrode sheet 40 such that it is in contact with both the positive electrode active material layer 34 of the positive electrode sheet 30 and the negative electrode active material layer 44 of the negative electrode sheet 40. In addition, the separator has the role of preventing electrical shorts arising from direct contact between the active material layers 34, 44 on the active electrode sheet 30 and the negative electrode sheet 40, and the role of forming a conductive path between the electrodes through the penetration of the electrolyte solution into the pores of the separator 50. Preferably a porous sheet of resin (microporous resin sheet) can be used as the constituent material of this separator 50. A porous polyolefin resin of polyethylene (PE), polypropylene (PP), polystyrene, and the like is preferred. In particular, PE sheets, PP sheets, or a sheet with a bilayer structure formed by overlaying a PE layer and a PP layer can be most suitably used. Preferably the thickness of the separator is established within a range, for example, of about 10 μm to 40 μm.

A battery 100 that has been assembled as described above can be subjected to a variety of processing treatments as needed. Typically, for example, as an initial charging treatment an external power source is connected between the positive electrode (positive terminal 38) and negative electrode (negative terminal 48) of the battery, and charging is carried out at normal temperature (typically, about 25° C.) until the voltage between the terminals reaches a given value.

Preferably the given voltage between the terminals lies in the range between 2.5 V to 4.2 V, and a range between 3.0 V and 4.1 V is particularly preferred. The initial charging step can be carried out, for example, using constant current-constant voltage charging (CC-CV charging) wherein charging is carried out from the start at a constant current of about 0.1 C to 10 C until the voltage between the terminals reaches a given value, and then charging is carried out at a constant voltage until the SOC (State of Charge) reaches about 60% to 100%. Alternatively, charging can be carried out from the start of charging at a charge rate (current value) of ⅓ C or less (typically ½₀ C to ⅓ C) until at least an SOC of 20% is reached, and then further charging at a constant voltage of about 0.1 C to 10 C can be carried out until the voltage between the terminals reaches a predetermined voltage, and moreover charging at a constant voltage can be carried out until the SOC reaches about 60% to 100%.

It should also be noted that in the initial charging treatment, for example, a voltmeter can be connected between the positive terminal 38 and negative terminal 48 in the lithium-ion secondary battery 100, the voltage measured by the voltmeter can be monitored, and the charging can be ended when a preliminarily established, given voltage value has been reached. Furthermore, after the initial charging step has been completed, a discharge treatment can be performed at a current value approximately equal to the charge rate during constant current-constant voltage charging as a conditioning treatment, and then several charge-discharge cycles can be repeated at about the same rate as current value thereof. Alternatively, several charge-discharge cycles can be repeated at a rate different from the charge-discharge rate of the charge-discharge cycle.

Several embodiments relevant to the present invention are described below, but this is by no means intended to limit the present invention to these embodiments. In the following explanation the terms "parts" and "%" refer to "parts by mass" and "percentage by mass (mass %)" unless specifically stated otherwise.

Battery Fabrication

Example 1

For the positive electrode mixture a slurry composition was prepared by mixing the powdered positive electrode active material, acetylene black (conductive material), and PVDF (binder) at a mass ratio of 85:10:5 with N-methyl-2-pyrrolidone (NMP) so that the solids concentration (NV) would be about 50%. In this case, powdered lithium-manganese oxide ($LiMn_2O_4$) with an average particle size of 7 μm, specific surface area of 1 $m^2/g$, and a theoretical discharge capacity of 90 mA/g was used as the positive electrode active material.

The positive electrode mixture was applied to both sides of a continuous sheet aluminum foil 15 μm thick (positive current collector) so that the total amount applied to both sides would be 240 $g/m^2$ (as NV). After drying, this was compressed so that the total thickness would be about 110 μm to obtain the positive electrode sheet.

For the negative electrode mixture a slurry composition was prepared by mixing natural graphite, SBR, and CMC at a mass ratio of 98:1:1 with deionized water so that the NV concentration would be about 45%. The negative electrode mixture was applied to both sides of a continuous sheet copper foil 10 μm thick (negative current collector) so that the total amount applied to both sides would be 80 $g/m^2$ (as NV). After drying, this was compressed so that the total thickness would be about 65 μm to obtain the negative electrode sheet.

For the nonaqueous electrolyte a mixed solvent of EC, DMC, and EMC at a volumetric ratio of 1:1:1 was used to prepare an LiPF$_6$ solution with a concentration of 1 mol/L.

Two 20 μm thick continuous porous polyethylene sheets were readied as separators.

Figure 7:
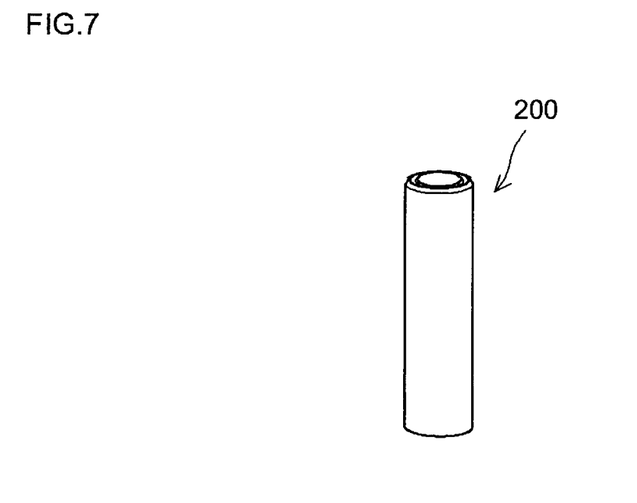
FIG. 7 is a perspective drawing schematically illustrating the shape of a model 18650 lithium-ion battery.

Using these battery components a model 18650 (cylindrical, 18 mm diameter and 65 mm high) lithium-ion secondary battery 200 was fabricated in the manner described below. In other words, the positive electrode sheet, negative electrode sheet and two separators were suitably layered, and the layered assembly was wound in the lengthwise direction to fabricate a wound electrode assembly. This electrode assembly was placed in a cylindrical container together with the nonaqueous electrolyte, and the container was sealed to obtain the battery of Example 1.

Examples 2 to 15

The batteries of Examples 2 to 15 were obtained in the same manner as Example 1 except that a given amount of oxalic acid (additive A) and/or a given amount of VC (additive B) was added to the nonaqueous electrolyte. Table 1 shows the amounts of additive A and additive B that were added to the nonaqueous electrolyte of each battery.

Initial Charging Treatment

Constant current charging for 3 hours at a rate of 1/10 C was carried out on batteries obtained in Examples 1 to 5, and then three cycles of charging to 4.1 V at a rate of 1/3 C and discharging to 3.0 V at a rate of 1/3 C were repeated to carry out initial charging and a conditioning treatment.

Measurement of Initial Internal Resistance

After the initial charging, the SOC (State of Charge) was adjusted to 60%, and the battery voltage (V) was measured 10 seconds after drawing currents (I) of 0.2 A, 0.4 A, 0.6 A and 1.2 A at 25° C. Linear regression was applied to the relation of the current I (X-axis) against the voltage V (Y-axis) of each battery, and the initial IV resistance (mΩ) was determined from the slope.

Measurement of Capacity Retention

Each battery was first adjusted to SOC 80%, the battery was CC-discharged at a room temperature of 23° C. to SOC 0% at a rate of 1/3 C, and the discharge capacity was measured at that time and used as the initial capacity value.

After each battery was stored at 60° C. for 30 days, the post-storage discharge capacity was measured in the same manner as the initial capacity. The capacity retention (%) was determined as the percentage of the post-storage discharge capacity versus the initial capacity.

Measurement of Increase in Internal Resistance

For each stored battery the post-storage IV resistance (mΩ) was measured in the same manner as the initial internal resistance. The difference between the initial IV resistance value and the post-storage IV resistance value was used as the increase in internal resistance (mΩ).

Table 1 shows the measurement results for Examples 1 to 15 together with the amounts of additive A and additive B that were used.

Figure 3:
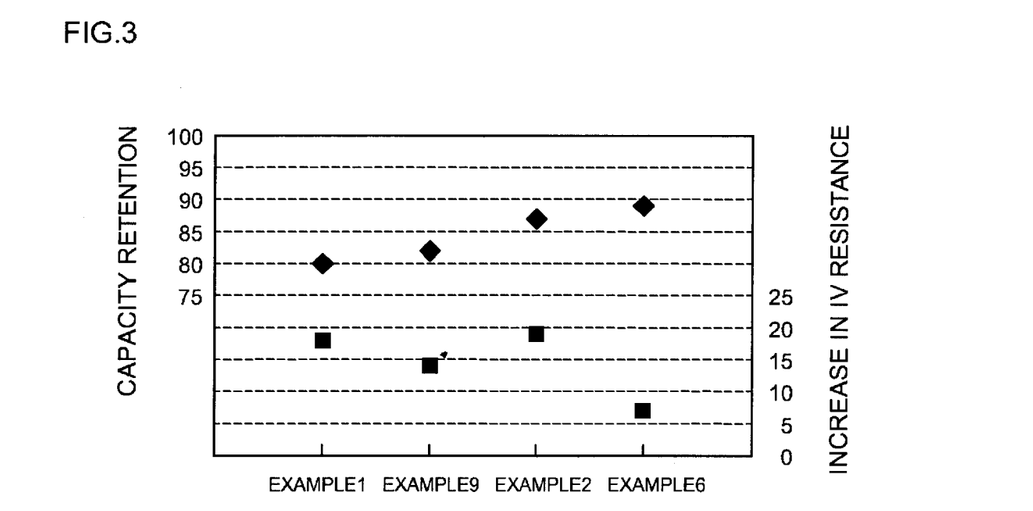
FIG. 3 is a graph illustrating the capacity retention and amount of increase in internal resistance after high-temperature storage of batteries in several of the embodiments.

FIG. 3 shows a graph comparing the capacity retention (left Y-axis) and the amount of IV resistance increase (right Y-axis of the batteries of Examples 1, 2, 6, and 9 after storage.

Figure 4:
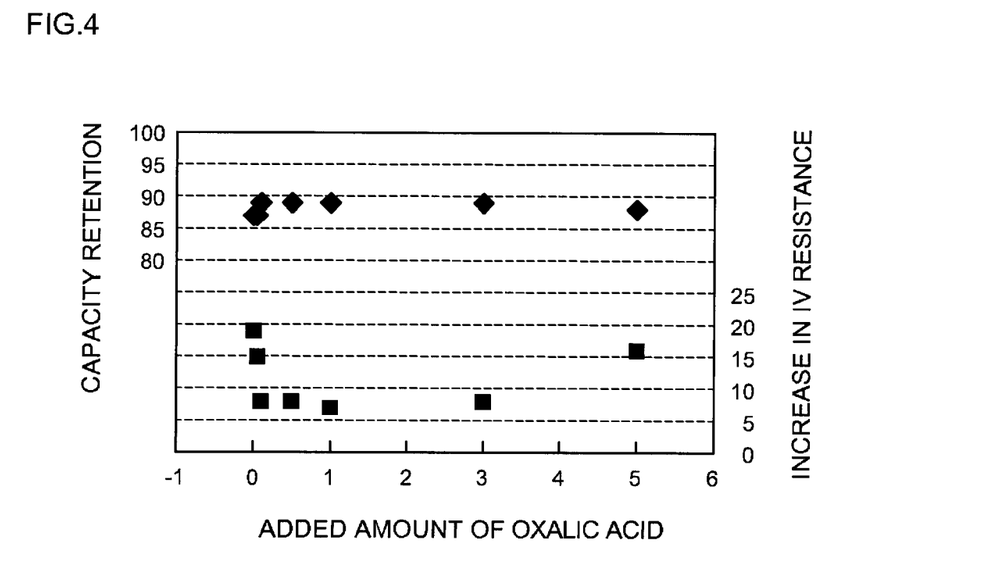
FIG. 4 is a graph illustrating the correlation between the amount of additive A that was added plotted against capacity retention and the amount of increase in internal resistance after high-temperature storage.

Moreover, FIG. 4 shows the capacity retention (left Y-axis) and the amount of IV resistance increase (right Y-axis versus the amount of VC added (X-axis) after storage based on measured values of batteries of Examples 2 to 8 in which the added amount of VC (additive B) was fixed at 1% by mass and the added amounts of oxalic acid (additive A) were varied between 0% by mass and 5% by mass.

Figure 5:
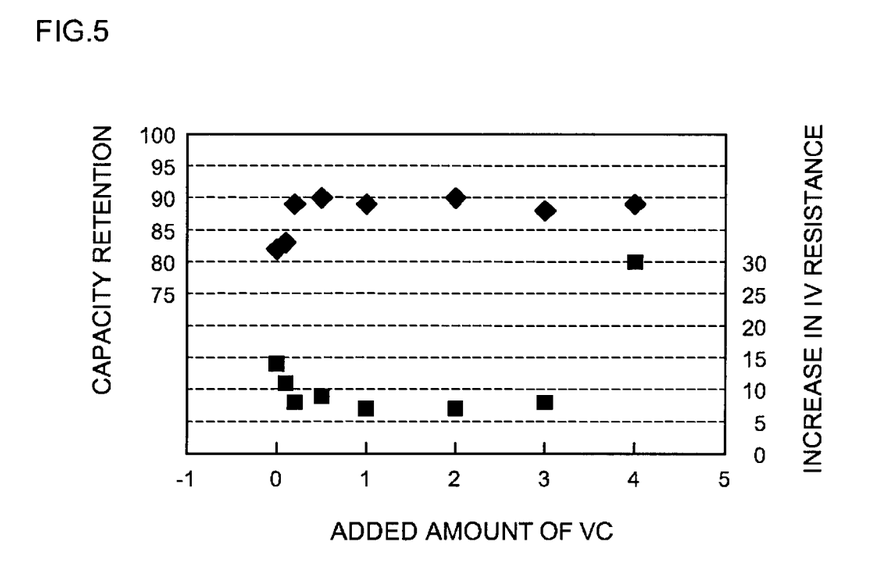
FIG. 5 is a graph illustrating the correlation between the amount of additive B that was added plotted against capacity retention and the amount of increase in internal resistance after high-temperature storage.
Figure 6:
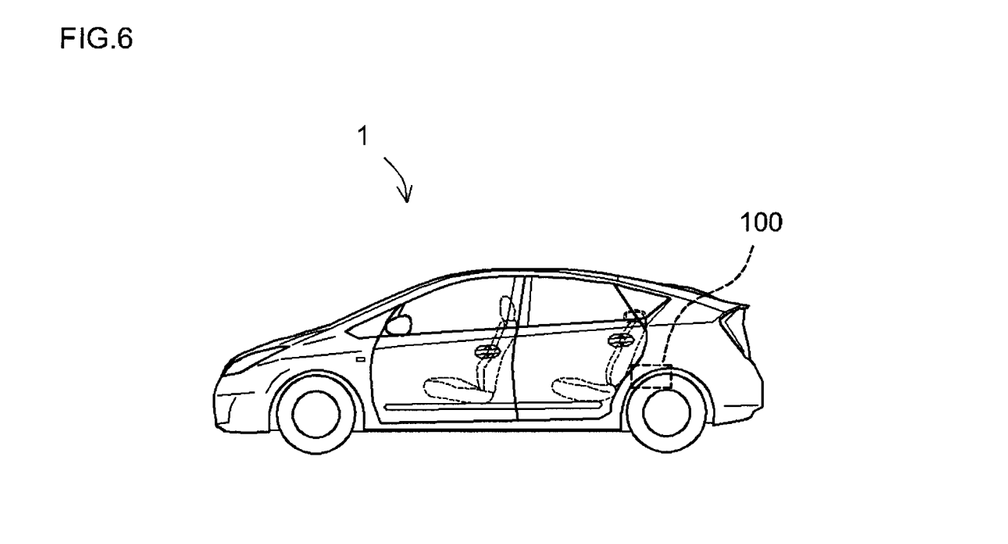
FIG. 6 is a side view schematically illustrating a vehicle (automobile) equipped with the lithium-ion secondary battery of the present invention.

Similarly, FIG. 5 shows the capacity retention (left y-axis) and the amount of IV resistance increase (right y-axis versus the amount of oxalic acid added (x-axis) after storage based on measured values of batteries of Examples 6 and 9 to 15 in which the added amount of oxalic acid (additive A) was fixed at 1% by mass and the added amounts of VC (additive B) were varied between 0% by mass and 4% by mass.

TABLE 1

| | Additive | | | After storage at 60° C. for 30 days | | |
| | | | | Increase | | |
| Example | A (mass %) | B (mass %) | Initial IV resistance (mΩ) | IV resistance (mΩ) | in IV resistance (mΩ) | Capacity retention (%) |
| --- | --- | --- | --- | --- | --- | --- |
| 1 | 0 | 0 | 52 | 70 | 18 | 80 |
| 2 | 0 | 1 | 54 | 73 | 19 | 87 |
| 3 | 0.1 | 1 | 55 | 70 | 15 | 87 |
| 4 | 0.2 | 1 | 56 | 64 | 8 | 90 |
| 5 | 0.5 | 1 | 56 | 64 | 8 | 89 |
| 6 | 1 | 1 | 55 | 62 | 7 | 89 |
| 7 | 3 | 1 | 57 | 65 | 8 | 89 |
| 8 | 5 | 1 | 58 | 74 | 16 | 88 |
| 9 | 1 | 0 | 54 | 68 | 14 | 82 |
| 10 | 1 | 0.05 | 57 | 68 | 11 | 83 |
| 11 | 1 | 0.1 | 56 | 64 | 8 | 89 |
| 12 | 1 | 0.5 | 55 | 64 | 9 | 90 |
| 13 | 1 | 2 | 56 | 63 | 7 | 90 |
| 14 | 1 | 3 | 57 | 65 | 8 | 88 |
| 15 | 1 | 4 | 58 | 88 | 30 | 89 |

As can be clearly seen from FIG. 3, the battery of Example 6, which used a nonaqueous electrolyte with a composition that contained both additive A (in this case, oxalic acid) and additive B (in this case VC) held the increase in internal resistance to a low 7 mΩ and exhibited a high capacity retention of 89% after storage at 60° C. for 30 days. Meanwhile, in both the battery of Example 1, which used a nonaqueous electrolyte with a composition that contained neither additive A nor additive B, and the battery of Example 9, which used a nonaqueous electrolyte that contained only additive A, the increase in internal resistance was at least two times higher than in the battery of Example 6, and the capacity retention was also at least 6% lower than the battery of Example 6. Moreover, in the battery of Example 2, which used a nonaqueous electrolyte that contained only additive B, the capacity retention was 2% lower than in the battery of Example 6, and the increase in internal resistance was nearly three times that of the battery of Example 6.

Moreover, as shown in Table 1 and FIGS. 4 and 5, in the batteries of Examples 4 to 7 and 11 to 14 containing 0.2% by mass to 3% by mass of additive A and 0.1% by mass to 3% by mass of additive B, the increase in internal resistance was held down to 11 mΩ or less, and all had a high capacity retention of 88% to 90% after storage at 60° C. for 30 days. In other words, these batteries of Examples 4 to 7 and 11 to 14 had a lower increase in resistance and higher capacity retention than the batteries of Examples 3, 8, 10, and 15, which contained either additive A or additive B at a concentration outside the above range.

Concrete examples of the present invention have been described in detail, but these are merely examples and by no means limit the scope of the claims. The technology described in the claims also includes various modifications and changes in the concrete examples exemplified above.

BRIEF DESCRIPTION OF THE REFERENCE SYMBOLS

1 Vehicle
20 Wound electrode assembly
30 Positive electrode sheet
32 Positive current collector
34 Positive electrode active material layer
38 Positive terminal
40 Negative electrode sheet
42 Negative current collector
44 Negative electrode active material layer
48 Negative terminal
50 Separator
100,200 Lithium-ion secondary battery

The invention claimed is:

1. A lithium-ion secondary battery comprising:
 positive and negative electrodes capable of absorbing and desorbing lithium ions, the negative electrode comprising a particulate carbon material as a negative electrode active material; and
 a nonaqueous electrolyte containing a lithium salt as a supporting salt in an organic solvent, wherein
 the nonaqueous electrolyte further contains:
 at least one dicarboxylic acid as additive A; and
 at least one type of substance selected from vinylene carbonate, vinylethylene carbonate, ethylene sulfite, and fluoroethylene carbonate as additive B;
 and wherein the non-aqueous electrolyte is free from an anhydride of dicarboxylic acid.

2. The lithium-ion secondary battery according to claim 1, wherein the nonaqueous electrolyte contains 0.2% by mass to 3% by mass of the additive A.

3. The lithium-ion secondary battery according to claim 1, wherein the nonaqueous electrolyte contains 0.1% by mass to 3% by mass of the additive B.

4. A vehicle comprising the lithium-ion secondary battery according to claim 1 as a power source.

5. The lithium-ion secondary battery according to claim 1, wherein the additive A is oxalic acid and the additive B is vinylene carbonate.

6. The lithium-ion secondary battery according to claim 1, wherein the negative electrode further comprises a negative current collector and a negative electrode active material layer including the particulate carbon material and a binder.

7. The lithium-ion secondary battery according to claim 6, wherein a mass ratio of the negative electrode active material to the binder is from 95:5 to 99:1.

* * * * *